W. FIAL.
VEHICLE STOPPING DEVICE.
APPLICATION FILED MAY 25, 1921.
1,419,366.
Patented June 13, 1922.
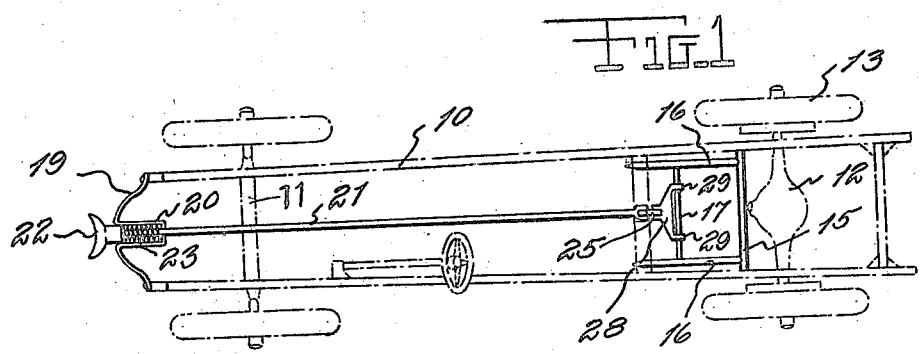
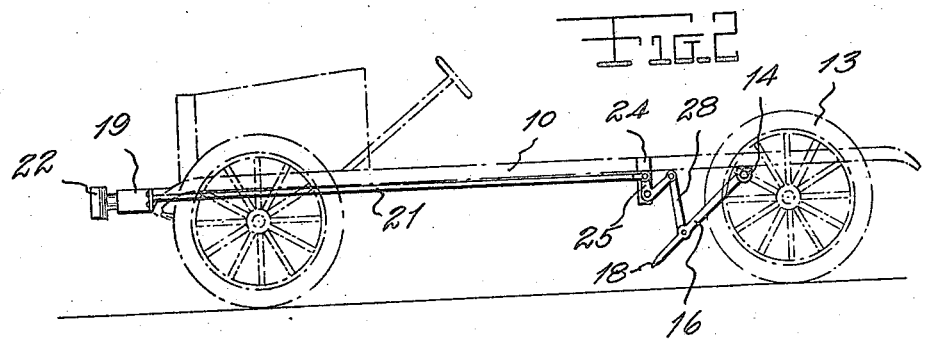
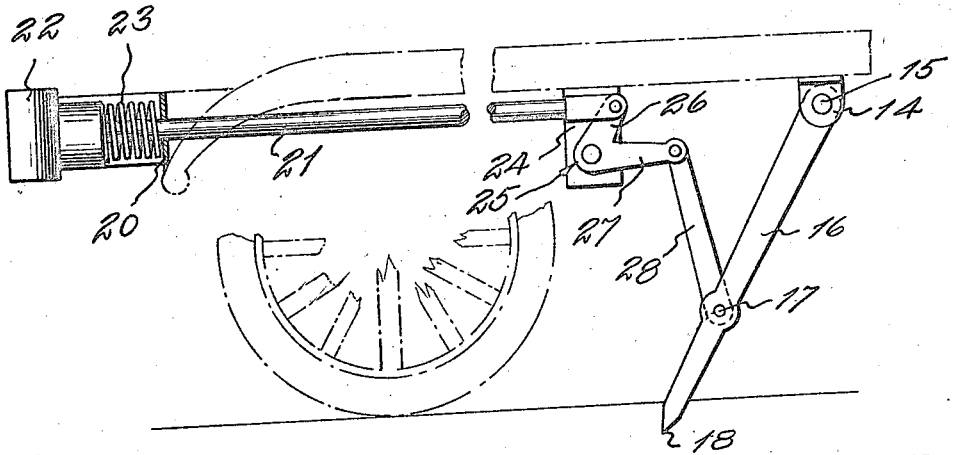
INVENTOR
Wojciech Fial
BY
ATTORNEY

UNITED STATES PATENT OFFICE.

WOJCIECH FIAL, OF HARVEY, WEST VIRGINIA, ASSIGNOR OF ONE-HALF TO ENGELBERT NICOLUSSI, OF GLENDIVE, MONTANA.

VEHICLE STOPPING DEVICE.

1,419,366.      Specification of Letters Patent.      Patented June 13, 1922.

Application filed May 25, 1921. Serial No. 472,503.

*To all whom it may concern:*

Be it known that I, WOJCIECH FIAL, a citizen of Poland, residing at Harvey, in the county of Fayette and State of West Virginia, have invented certain new and useful Improvements in Vehicle Stopping Devices, of which the following is a specification.

This invention relates to improvements in stop mechanisms and more particularly to such devices adapted for application to motor vehicles and the like. The principal object of the invention resides in the provision of a stop mechanism which operates when the vehicle encounters an object to simultaneously stop forward motion of the vehicle and elevate the drive wheels so as to prevent their tractive effort.

With these and other objects in view the invention consists in the novel construction, combination and arrangement of parts which will be fully set forth in the following specification, claimed and illustrated in the accompanying drawing, in which, Figure 1 is a top plan view of a chassis showing the stop mechanism attached thereto, Figure 2 is a side view of Figure 1, and Figure 3 is a view showing the device in operative position.

Referring to the drawings in detail the numeral 10 designates the vehicle chassis provided with the usual forward axle 11 and rear axle housing 12 upon the ends of which are rotatably mounted the rear drive wheels 13.

Secured to the under sides of the side bars of the chassis 10, at a point slightly forward of the axle housing 12 are bearings 14 in which the ends of a transversely extending shaft 15 are journaled. Secured to the shaft 15 near opposite ends, are legs 16 which are held in spaced parallel relation by a cross bar 17 secured near the free end of each leg. As shown in the drawings the free end of each leg is pointed, as at 18, so that when the device is tripped it will bite into the surface traversed and prevent movement of the vehicle.

Connecting the forward ends of the side bars of the chassis 10 is a bar 19 formed with a pocket 20 intermediate its ends and the innermost wall of said pocket is provided with an opening to receive and guide the plunger rod 21. A buffer member 22 is secured to the forward end of the rod 21 and a spring 23 is interposed between the inner wall of the pocket and the rear end of the buffer to yieldably hold the buffer and associated mechanism in a projected position.

Secured to a suitable hanger 24 at a point forward of the bearing member 14 is a bell-crank 25, the shorter arm 26 of which extends upwardly in a substantially vertical plane while the longer arm 27 extends upwardly and rearwardly. The rear end of the rod 21 is pivoted to the free end of the arm 26 of the bell-crank 25 in such a manner that when the buffer moves rearwardly the longer arm 27 of the bell-crank will swing down into the position shown in Figure 3. A link 28 connects the free end of the arm 27 to the rod 15 and this link is preferably shaped as shown in Figure 1 to provide a pair of apertured ears 29 through which the rod 15 extends. It will then be seen that when the vehicle encounters an object and the buffer is pressed inwardly against the spring 23 the legs 16 will be swung into the position shown in Figure 3 so that the points 18 will bite into the road surface and the forward momentum of the vehicle will tend to cause the legs to move into a vertical position, thereby raising the weight from the rear drive wheels and preventing their tractive effect to the minimum.

While in the foregoing there has been shown and described the preferred embodiment of this invention, it is to be understood that minor changes in details of construction, combination and arrangement of parts may be made without departing from the spirit and scope of the invention as claimed.

What is claimed is:

The combination with the frame of a self propelled vehicle having drive wheels near its rear end, of a buffer at the forward end of the frame, legs pivoted to said frame slightly forward of and adjacently between the drive wheels, a bell-crank pivoted near said legs, a rod connecting the buffer with one arm of the bell-crank, and a link connecting the opposite arm of the bell-crank to the legs in such a manner that when the buffer is engaged the legs will be lowered into contact with the surface traversed to elevate the drive wheels.

In witness whereof I affix my signature.

WOJCIECH FIAL.